(12) United States Patent
Kline

(10) Patent No.: US 9,153,116 B2
(45) Date of Patent: Oct. 6, 2015

(54) REAL-TIME VEHICLE DRIVER PERFORMANCE MONITORING

(71) Applicant: International Business Machines Corporation, Armonk, NY (US)

(72) Inventor: Eric V. Kline, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 14/021,681

(22) Filed: Sep. 9, 2013

(65) Prior Publication Data

US 2015/0070178 A1  Mar. 12, 2015

(51) Int. Cl.
 *B60Q 1/00* (2006.01)
 *G08B 21/08* (2006.01)
 *B60W 40/09* (2012.01)

(52) U.S. Cl.
 CPC ............... *G08B 21/08* (2013.01); *B60W 40/09* (2013.01)

(58) Field of Classification Search
 CPC ... G08G 1/0969; G08G 1/127; G08G 5/0026; A61H 3/061; A61H 3/068; B60K 28/06; B60K 2350/962; B60K 28/02; B60K 28/10; A61B 2503/22; B60W 40/09
 USPC .................................. 340/575, 576, 439, 438
 See application file for complete search history.

(56) References Cited

U.S. PATENT DOCUMENTS

| | | | | |
|---|---|---|---|---|
| 4,594,583 A | * | 6/1986 | Seko et al. | 340/576 |
| 4,896,101 A | * | 1/1990 | Cobb | 324/73.1 |
| 5,532,690 A | * | 7/1996 | Hertel | 340/989 |
| 5,546,305 A | * | 8/1996 | Kondo | 340/576 |
| 5,694,116 A | * | 12/1997 | Kojima | 340/576 |
| 5,732,377 A | * | 3/1998 | Eckert | 701/83 |
| 5,815,070 A | * | 9/1998 | Yoshikawa | 340/439 |
| 6,014,081 A | * | 1/2000 | Kojima et al. | 340/576 |
| 6,223,125 B1 | | 4/2001 | Hall | |
| 7,389,178 B2 | * | 6/2008 | Raz et al. | 701/29.1 |
| 7,663,495 B2 | * | 2/2010 | Haque et al. | 340/576 |
| 7,812,712 B2 | | 10/2010 | White et al. | |
| 7,956,730 B2 | | 6/2011 | White et al. | |
| 8,155,868 B1 | * | 4/2012 | Xing et al. | 701/123 |
| 8,170,725 B2 | * | 5/2012 | Chin et al. | 701/1 |

(Continued)

FOREIGN PATENT DOCUMENTS

| | | |
|---|---|---|
| KR | 20100070592 | 6/2010 |
| KR | 20100070592 A | 6/2010 |

*Primary Examiner* — Jennifer Mehmood
*Assistant Examiner* — Rufus Point
(74) *Attorney, Agent, or Firm* — Marcia L. Doubet

(57) ABSTRACT

Real-time vehicle driver performance monitoring uses a plurality of sensors operated in a vehicle, each generating a real-time data stream comprising data corresponding to operation of the vehicle by the vehicle's driver. A computing device (such as an in-vehicle computer) processes the generated data stream from each of the plurality of sensors to determine whether the operation of the vehicle triggers any of a plurality of predetermined operational alert triggers. The predetermined operational alert triggers may correspond to detecting characteristics of an improper magnitude and/or an improper linearity of a delta in data detected by one of the sensors. When an alert is triggered, a corresponding alert message is generated and sent to at least one recipient (e.g., to the vehicle's driver, to nearby driver(s), to authorities, etc.). Examples of monitored characteristics include speed, steering, braking, use of turn indicators by the driver, and mobile phone usage.

20 Claims, 11 Drawing Sheets

(56) References Cited

U.S. PATENT DOCUMENTS

| | | | |
|---|---|---|---|
| 8,359,901 B2 | 1/2013 | Freund et al. | |
| 8,483,903 B2 * | 7/2013 | Tengler et al. | 701/32.3 |
| 8,489,253 B2 * | 7/2013 | Shirakata et al. | 701/1 |
| 8,549,318 B2 | 10/2013 | White et al. | |
| 8,694,208 B2 * | 4/2014 | Yokota | 701/41 |
| 2003/0137408 A1 * | 7/2003 | Breiner | 340/425.5 |
| 2004/0215373 A1 * | 10/2004 | Won et al. | 701/1 |
| 2005/0131597 A1 * | 6/2005 | Raz et al. | 701/29 |
| 2005/0219058 A1 * | 10/2005 | Katagiri et al. | 340/575 |
| 2006/0212195 A1 | 9/2006 | Veith et al. | |
| 2007/0001831 A1 * | 1/2007 | Raz et al. | 340/439 |
| 2007/0109146 A1 * | 5/2007 | Tengler et al. | 340/902 |
| 2007/0202929 A1 * | 8/2007 | Satake | 455/569.1 |
| 2008/0064446 A1 * | 3/2008 | Camp et al. | 455/565 |
| 2008/0105482 A1 * | 5/2008 | Yamaguchi et al. | 180/271 |
| 2008/0106390 A1 | 5/2008 | White | |
| 2008/0223646 A1 | 9/2008 | White et al. | |
| 2008/0228365 A1 | 9/2008 | White et al. | |
| 2008/0258890 A1 * | 10/2008 | Follmer et al. | 340/439 |
| 2009/0140887 A1 * | 6/2009 | Breed et al. | 340/990 |
| 2009/0192666 A1 * | 7/2009 | Trippler | 701/29 |
| 2010/0019880 A1 * | 1/2010 | Huang et al. | 340/5.1 |
| 2010/0023223 A1 * | 1/2010 | Huang et al. | 701/44 |
| 2010/0211270 A1 * | 8/2010 | Chin et al. | 701/44 |
| 2011/0187522 A1 * | 8/2011 | Filev et al. | 340/441 |
| 2012/0214472 A1 | 8/2012 | Tadayon et al. | |
| 2012/0278766 A1 | 11/2012 | Massengill | |

\* cited by examiner

| Sec | Standard Velocity | Real-Time Velocity | Standard Acceleration | Real-Time Acceleration | Delta |
|---|---|---|---|---|---|
| 0 | 0 | 0 | 0 | 0 | 0 |
| 1 | 5 | 5 | 5 | 5 | 0 |
| 2 | 10 | 10 | 5 | 5 | 0 |
| 3 | 15 | 15 | 5 | 5 | 0 |
| 4 | 20 | 20 | 5 | 5 | 0 |
| 5 | 25 | 25 | 5 | 5 | 0 |
| 6 | 30 | 30 | 5 | 5 | 0 |
| 7 | 35 | 35 | 5 | 5 | 0 |
| 8 | 40 | 40 | 5 | 5 | 0 |
| 9 | 45 | 45 | 5 | 5 | 0 |
| 10 | 50 | 50 | 5 | 5 | 0 |
| 11 | 55 | 55 | 5 | 5 | 0 |
| 12 | 60 | 60 | 5 | 5 | 0 |
| 13 | 62 | 62 | 2 | 2 | 0 |
| 14 | 63 | 63 | 1 | 1 | 0 |
| 15 | 64 | 64 | 1 | 1 | 0 |
| 16 | 65 | 65 | 1 | 1 | 0 |
| 17 | 65 | 65 | 0 | 0 | 0 |
| 18 | 65 | 65 | 0 | 0 | 0 |
| 19 | 65 | 65 | 0 | 0 | 0 |
| 20 | 65 | 65 | 0 | 0 | 0 |

Column labels: 310, 320, 330, 340, 350, 360. Row labels: 301 (Sec=0), 302 (Sec=2).

FIG. 4

| | Sec (410) | Standard Velocity (420) | Real-Time Velocity (430) | Standard Acceleration (440) | Real-Time Acceleration (450) | Delta (460) | 1st D (470) | 2nd D (480) | Delta D (490) |
|---|---|---|---|---|---|---|---|---|---|
| | 0 | 0 | 0 | 0 | 0 | 0 | 0 | 0 | 0 |
| 402 | 1 | 5 | 10 | 5 | 10 | 5 | 5 | 5 | 0 |
| | 2 | 10 | 20 | 5 | 10 | 5 | 0 | -5 | 5 |
| | 3 | 15 | 30 | 5 | 10 | 5 | 0 | 0 | 0 |
| | 4 | 20 | 40 | 5 | 10 | 5 | 0 | 0 | 0 |
| | 5 | 25 | 50 | 5 | 10 | 5 | 0 | 0 | 0 |
| | 6 | 30 | 60 | 5 | 10 | 5 | 0 | 0 | 0 |
| 403 | 7 | 35 | 70 | 5 | 10 | 5 | 0 | 0 | 0 |
| 404 | 8 | 40 | 75 | 5 | 5 | 0 | -5 | -5 | 0 |
| | 9 | 45 | 80 | 5 | 5 | 0 | 0 | 5 | -5 |
| | 10 | 50 | 85 | 5 | 5 | 0 | 0 | 0 | 0 |
| | 11 | 55 | 90 | 5 | 5 | 0 | 0 | 0 | 0 |
| | 12 | 60 | 95 | 5 | 5 | 0 | 0 | 0 | 0 |
| 405 | 13 | 62 | 100 | 2 | 5 | 3 | 3 | 3 | 0 |
| 406 | 14 | 63 | 100 | 1 | 0 | -1 | -4 | -7 | 3 |
| | 15 | 64 | 100 | 1 | 0 | -1 | 0 | 4 | -4 |
| | 16 | 65 | 100 | 1 | 0 | -1 | 0 | 0 | 0 |
| | 17 | 65 | 100 | 0 | 0 | 0 | 1 | 1 | 0 |
| | 18 | 65 | 100 | 0 | 0 | 0 | 0 | -1 | 1 |
| | 19 | 65 | 100 | 0 | 0 | 0 | 0 | 0 | 0 |
| | 20 | 65 | 100 | 0 | 0 | 0 | 0 | 0 | 0 |

FIG. 7

| Sec (710) | Standard Velocity (720) | Real-Time Velocity (730) | Standard Acceleration (740) | Real-Time Acceleration (750) | Delta (760) | 1st D (770) | 2nd D (780) | Delta D (790) |
|---|---|---|---|---|---|---|---|---|
| 0 | 0 | 0 | 0 | 0 | 0 | 0 | 0 | 0 |
| 1 | 5 | 10 | 5 | 10 | 5 | 5 | 5 | 0 |
| 2 | 10 | 12 | 5 | 2 | -3 | -8 | -13 | 5 |
| 3 | 15 | 18 | 5 | 6 | 1 | 4 | 12 | -8 |
| 4 | 20 | 40 | 5 | 22 | 17 | 16 | 12 | 4 |
| 5 | 25 | 38 | 5 | -2 | -7 | -24 | -40 | 16 |
| 6 | 30 | 34 | 5 | -4 | -9 | -2 | 22 | -24 |
| 7 | 35 | 44 | 5 | 10 | 5 | 14 | 16 | -2 |
| 8 | 40 | 55 | 5 | 11 | 6 | 1 | -13 | 14 |
| 9 | 45 | 70 | 5 | 15 | 10 | 4 | 3 | 1 |
| 10 | 50 | 55 | 5 | -15 | -20 | -30 | -34 | 4 |
| 11 | 55 | 45 | 5 | -10 | -15 | 5 | 35 | -30 |
| 12 | 60 | 65 | 5 | 20 | 15 | 30 | 25 | 5 |
| 13 | 62 | 75 | 2 | 10 | 8 | -7 | -37 | 30 |
| 14 | 63 | 55 | 1 | -20 | -21 | -29 | -22 | -7 |
| 15 | 64 | 50 | 1 | -5 | -6 | 15 | 44 | -29 |
| 16 | 65 | 65 | 1 | 15 | 14 | 20 | 5 | 15 |
| 17 | 65 | 75 | 0 | 10 | 10 | -4 | -24 | 20 |
| 18 | 65 | 80 | 0 | 5 | 5 | -5 | -1 | -4 |
| 19 | 65 | 60 | 0 | -20 | -20 | -25 | -20 | -5 |
| 20 | 65 | 55 | 0 | -5 | -5 | 15 | 40 | -25 |

REAL-TIME VEHICLE DRIVER PERFORMANCE MONITORING

BACKGROUND OF THE INVENTION

The present invention relates to computer programming, and deals more particularly with using computing devices for performing real-time monitoring of vehicle driver performance (for example, for enhancing the driving safety of vehicles).

Automotive safety is a perennial human safety and well-being requirement, and the need for enhancing safety is ongoing.

BRIEF SUMMARY OF THE INVENTION

The present invention provides real-time vehicle driver performance monitoring. In one embodiment, this comprises: operating a plurality of sensors in a vehicle, each generating a real-time data stream corresponding to operation of the vehicle by a driver thereof; processing, by a computing device, the generated data stream from each of the plurality of sensors to determine whether the operation of the vehicle triggers any of a plurality of predetermined operational alert triggers, wherein at least one of the predetermined operational alert triggers corresponds to detecting characteristics of an improper magnitude in the data stream generated by one of the sensors and at least one of the predetermined operational alert triggers corresponds to detecting characteristics of an improper linearity of a delta in the data stream generated by one of the sensors; and responsive to any of the plurality of predetermined operational alert triggers being triggered, performing: generating a corresponding alert message for the triggered operational alert; determining at least one recipient corresponding to the generated alert message; and sending the generated alert message to the determined at least one recipient. Radio frequency broadcast transmission from a radio frequency transmitting device in the vehicle may be used when sending the generated alert message externally to the vehicle (e.g., to nearby vehicles), while an interface (which may be audible and/or visual) within the vehicle is preferably used for sending the alert message to the vehicle's driver.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates observed and computed values for several monitored characteristics and corresponds to measurements taken at a point in time for a hypothetical driver who exhibits a typical driving scenario, while

FIG. 3 is a table presenting sample values for velocity and acceleration, and corresponds to monitored characteristics for a non-erratic driving scenario;

FIG. 4 is a table presenting sample values for velocity and acceleration, and corresponds to monitored characteristics for a driving scenario where several performance violations have been detected;

FIG. 7 is a table presenting sample values for velocity and acceleration, and corresponds to monitored characteristics for a dangerous driving scenario;

DETAILED DESCRIPTION OF THE INVENTION

Figure 1:
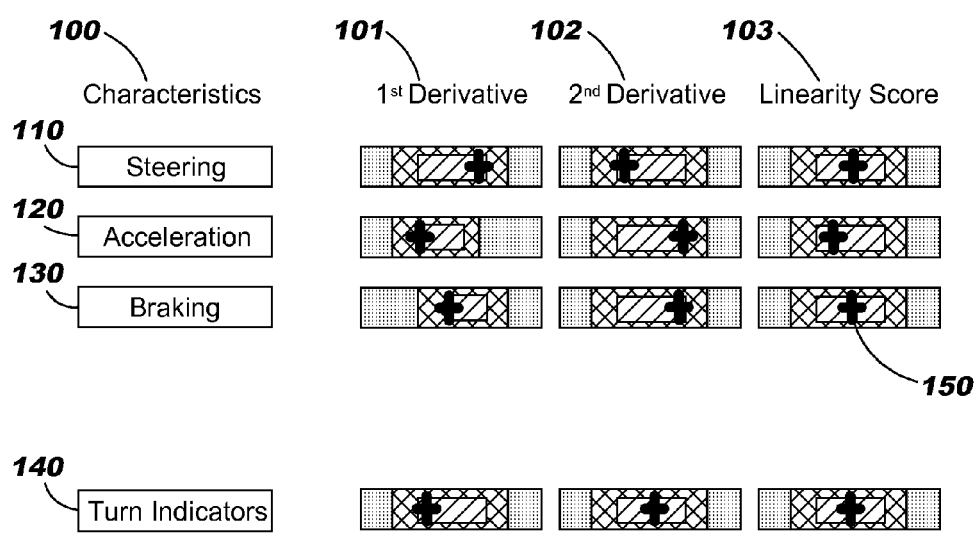

Embodiments of the present invention are directed toward real-time vehicle driver performance monitoring, which may enhance driving safety in vehicles. An embodiment of the present invention uses the monitored performance information to generate alerts, which may be predictive of future issues or events related to the driver's performance. The alerts may improve safety by serving as early warnings that may lead to corrective action on the part of the driver and/or avoidance actions on the part of drivers of nearby vehicles.

Dangerous driving performance may be exhibited by drivers who are impaired or distracted, putting the driver at risk as well as putting other nearby drivers at risk. Accordingly, erratic driving may be advantageously detected by an embodiment of the present invention. In a preferred embodiment, a plurality of sensors are operated in a vehicle, each generating a real-time data stream comprising data corresponding to operation of the vehicle by the vehicle's driver. A computing device (such as an in-vehicle computer) processes the generated data stream from each of the plurality of sensors to determine whether the operation of the vehicle triggers any of a plurality of predetermined operational alert triggers. As will be discussed in further detail below, at least one of the predetermined operational alert triggers that may be triggered corresponds to detecting characteristics of an improper magnitude in data detected by one of the sensors and at least one of the predetermined operational alert triggers that may be triggered corresponds to detecting characteristics of an improper linearity of a delta in data detected by one of the sensors. As will also be discussed in further detail below, when one of the predetermined operational alert triggers is triggered, a corresponding alert message is generated and sent to at least one recipient (e.g., to the vehicle's driver, to nearby driver(s), to authorities, etc.).

The driving performance of a driver is monitored in real-time, enabling continuous evaluation of that performance. Preferably, the monitoring is performed in terms of magnitude and linearity (where linearity is a measure of stability). By way of illustration but not of limitation, characteristics which may be monitored include magnitude and linearity of speed, magnitude and linearity of steering, linearity of braking, use of turn indicators by the driver, mobile phone usage (including voice and/or text usage) by the driver, and so forth, and an embodiment of the present invention may monitor one or more of these characteristics. (The monitored characteristics may alternatively be referred to as monitored parameters.) The observed information is compared to standards which are predetermined and which are codified in definitions referred to herein as "operational alert triggers" or "operational alert trigger definitions" to determine whether the standard (which is also referred to herein as a "threshold") defined therein has been exceeded. If so, then the corresponding alert is triggered. Radio frequency ("RF") transmission is preferably used when sending an alert message for the triggered alert externally to the vehicle (e.g., to nearby vehicles), while an interface (which may be audible and/or visual) within the vehicle is preferably used when sending an alert message to the vehicle's driver.

With reference to monitoring a driver's steering, for example, the magnitude measurement corresponds to the driver's maximum magnitude of steering wheel adjustment per unit of time, and the linearity refers to the frequency of steering wheel adjustments per unit of time. It might be determined, for example, that the maximum magnitude of adjustment for safe driving is 17 degrees per second for a vehicle traveling at a speed between 15 miles per hour ("mph") and 30 mph, and this value may therefore be set as a threshold in an operational alert trigger specification. The observed value of degrees of steering wheel adjustment by a particular driver can then be compared to this operational alert trigger to determine whether an alert should be generated. As an example of linearity for steering, it might be determined that the standard for steering wheel adjustment on a road that is substantially flat and dry, for a vehicle traveling at a speed between 15 mph and 30 mph, is 5 to 10 adjustments per minute when the adjustments are less than 10 degrees; 3 to 4 adjustments per minute when the adjustments are greater than 10 degrees but less than 20 degrees; and 0 to 2 adjustments per minute when the adjustments are greater than 20 degrees but less than 45 degrees. These standards may be codified in one or more operational alert triggers, and the driver's performance can be compared to such operational alert trigger(s) to determine whether to generate a corresponding alert.

A preferred embodiment computes a first derivative and a second derivative of observed driving performance measurements, and compares these computed values to corresponding predetermined values. Use of derivatives enables evaluating trends in the driver's performance. (Static or "point in time" values may also be used in selected operational alert triggers. Furthermore, it should be noted that an embodiment of the present invention may use one of a first derivative or a second derivative, but not both, without deviating from the scope of the present invention.) It will be appreciated that computing a derivative of a measured characteristic corresponds to determining a rate of change in that measured characteristic. For example, velocity is the first derivative of displacement (of a vehicle, with reference to an embodiment of the present invention) in time and acceleration is the second derivative of the displacement in time. Accordingly, computing the rate of change in a measured characteristic allows evaluating whether a driver is performing erratically according to that characteristic. It should be noted that the computations described herein may be performed by a computing device that is physically located within the vehicle for which the driver's performance is being monitored. In addition or instead, the data streams generated by the one or more of the sensors which are operating in the vehicle may be sent to a remote location (such as a local law enforcement agency) where the computations will be performed, after which results may be returned to the vehicle, without deviating from the scope of the present invention.

FIG. 1 illustrates observed and computed values for several monitored characteristics and corresponds to measurements taken at a point in time for a hypothetical driver who exhibits a typical driving scenario, where this driver is not driving erratically according to the operational alert triggers of the example. In this illustration, the monitored characteristics 100 comprise steering 110; acceleration 120; braking 130; and use of turn indicators 140. The computed measurements include a first derivative 101; a second derivative 102; and a linearity score 103. A linearity score, according to the present invention, is a composite value computed from the first and second derivative values. A chart is illustrated in FIG. 1 in association with each of the characteristics, where predetermined portions (also referred to herein as zones) of each chart correspond to safe behavior, other portions correspond to borderline safe behavior, while other portions (referred to herein as danger zones) correspond to potentially dangerous behavior. If presented on a graphical user interface or other display, these portions may be color-coded in green, yellow, and red, respectively. Hash marks are used in FIG. 1 in the absence of color. A "plus"-shaped symbol 150 has been placed within each of the charts to represent where the hypothetical driver's point-in-time behavior falls in each. With reference to the steering 110 characteristic, for example, the first and second derivatives are both within the safe zone but nearing the borderline safe zone, with the first derivative approaching the borderline safe zone in one direction and the second derivative approaching it in the other direction, and the linearity score is near the midpoint of the safe zone.

Figure 2:
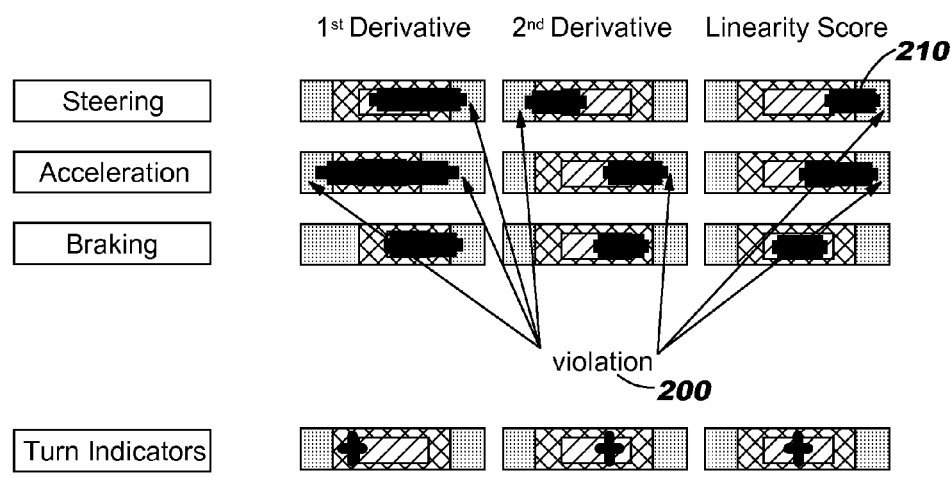
FIG. 2 illustrates values for the same monitored characteristics and corresponds to measurements taken over a period of time for a driver who is exhibiting some erratic driving.

By way of contrast to FIG. 1, the charts in FIG. 2 illustrate values for the same monitored characteristics and correspond to measurements taken over a period of time for a driver who is exhibiting some erratic driving. FIG. 2 uses an elongated "plus"-shaped symbol 210 to show the range of variability, over the point in time, in the measurements for each characteristic. It can be seen that a number of performance violations 200 are represented in FIG. 2, where the driver's performance has crossed into the danger zones. For example, the first and second derivative of the steering characteristic have both crossed into the danger zone, indicating that the driver is repeatedly changing the position of the steering wheel in an erratic manner. The linearity score has also crossed into the danger zone for the steering characteristic. With reference to the braking characteristic, it can be seen that the first derivative thereof is in the danger zone, indicating that the rate of changing the application of the brake pedal is deemed problematic. The second derivative, however, is not in the danger zone, nor is the linearity score. Thus, it can be seen that a performance violation with respect to one of the computed measurements does not necessarily result in a performance violation of other ones of the computed measurements. (Note that references herein to "performance violations" or "violations" are with reference to standards and thresholds codified in operational alert triggers. These violations are not necessarily violations of the law, and should not be interpreted as such.)

In the general case, a default set of operational alert triggers may be defined as a baseline, and these defaults may be specific to various factors. As non-limiting examples, default operational alert triggers may be provided which are specific to particular makes and/or models of vehicles; current driving conditions (such as weather, road type, and/or road condition); age of the vehicle; age of vehicle driver; and so forth. In some cases, operational alert triggers may specify a threshold which is conditioned by environmental conditions. An embodiment of the present invention may be adapted for using the default set, as provided. In addition or instead, an embodiment of the present invention may enable customizing operational alert triggers for various factors. As non-limiting examples, operational alert triggers may be customized as to driver's age; driver's past driving history; whether the driver wears glasses; and so forth. In one embodiment, allowable customizations by the driver depend on whether the driver has a justification—or perhaps an external approval—for changing the default values. In one scenario, the driver might be allowed to make a vision-change adjustment without external approval, whereas changes such as allowing wider deviations in speed-related measurements might be restricted and therefore allowed only with external approval. Examples of the type of external approval that may be provided include, by way of illustration but not of limitation, approval from a law enforcement agency or from the driver's insurance company. As yet another scenario, the driver may be allowed to make changes within a certain percentage of the default without external approval, whereas more significant changes are either not permitted or are permitted only with external approval.

FIG. 3 is a table 300 presenting sample values for velocity and acceleration, and corresponds to monitored characteristics for a non-erratic driving scenario. In this example, observed data values are captured every second. See column 310. In actual practice, values may be captured at other intervals. The interval to be used in a particular implementation may be set according to specifications from the vehicle manufacturer, from law enforcement, from an insurance carrier, and so forth. Optionally, the interval may be configurable.

FIG. 3 further illustrates sample real-time values for velocity and for acceleration, as shown in columns 330 and 350, respectively. Sample standard values (which may also be considered benchmark or threshold values) for velocity and acceleration are also illustrated in columns 320 and 340, respectively. As can be seen, a row is provided having entries for each of these columns, where the entries correspond to the real-time values captured at each 1-second interval. Finally, column 360 illustrates a delta, or difference, value for each row. The values shown in table 300 will now be discussed in further detail.

At time 0, all values are 0, indicating that no movement has taken place. See row 301. Row 302 corresponds to data observed 1 second later, in the example. Suppose that the standard speed for a first 1-second interval is set to 5 (representing 5 miles per hour, in this example). Further suppose that the driver exhibits a 5 mph speed. Accordingly, these scalar values are shown in columns 320, 330 of row 302. The acceleration standard 340 is computed by subtracting, from the standard velocity value 320 in the current row, the standard velocity value 320 in the previous row, and then dividing this result by the number of units of elapsed time. The example value 340 for row 302 is thus computed as (5−0)/(1−0), or 5. The real-time acceleration 350 is computed by subtracting, from the real-time velocity value 330 in the current row, the real-time velocity value 330 in the previous row, and then dividing this result by the number of units of elapsed time. The example value 350 for row 302 is thus computed as (5−0)/(1−0), or 5. Finally, the delta value 360 is computed by subtracting the standard acceleration 340 for the current row from the real-time acceleration 350 for the current row. The example delta value 360 for row 302 is thus computed as (5−5), or 0. (Note that a delta value of 0 indicates that the driver is performing in close approximation with the standard for the monitored characteristic.)

By review of the real-time velocity values 330 in table 300, it can be seen that these values correspond to a driver who is increasing at a uniform rate over the first 12 seconds, with slower increases until leveling off at 65 mph at time 16 seconds (i.e., at the 16th 1-second interval). It can also be seen that the real-time velocity values 330 are identical to the standard velocity values 320 of the example, and the real-time acceleration values 350 are identical to the standard acceleration values 340 of the example. In addition, it can be seen that all delta values 360 are zero, in the example. This driver is therefore exhibiting safe driving performance according to the sample measurements of velocity and acceleration.

FIG. 4 is a table 400 presenting sample values for velocity and acceleration, and corresponds to monitored characteristics for a driving scenario where several violations have been detected. As compared to table 300 of FIG. 3, note that FIG. 4 contains columns 410-460 which correspond to columns 310-360, while FIG. 4 also contains additional columns 470 for the first derivative, 480 for the second derivative, and 490 for the delta derivative. Values shown in table 400 will now be discussed in further detail.

The values in each row of columns 410-460 are determined as discussed above with reference to corresponding columns 310-360 of FIG. 3. It can be seen that row 402 contains values in these columns which are identical to the values in row 302. The first derivative 470 is computed by subtracting, from the delta value 460 in the current row, the delta value 460 in the previous row, and then dividing this result by the number of units of elapsed time. The example value 470 for row 402 is thus computed as (5−0)/(1−0), or 5. The second derivative 480 is computed by subtracting, from the first derivative value 470 in the current row, the first derivative value 470 in the previous row, and then dividing this result by the number of units of elapsed time. The example value 480 for row 402 is thus computed as (5−0)/(1−0), or 5. Finally, the delta derivative value 490 is computed by subtracting the second derivative value 480 for the current row from the first derivative value 470 for the current row. The example value 490 for row 402 is thus computed as (5−5), or 0.

By review of the real-time velocity values 430 in table 400, it can be seen that these values correspond to a driver who is increasing at a uniform rate over the first 7 seconds, with slower increases until leveling off at 100 mph at time 13 seconds (i.e., at the 13th 1-second interval). It can also be seen that the real-time velocity values 430 are consistently higher than the standard velocity values 420 of the example. The real-time acceleration values 450 are higher than the standard acceleration values 440 in some time intervals (e.g., in row 402), indicating that the acceleration is too high at these times, but at other times (e.g., in row 404), the real-time acceleration values 450 are identical to the standard acceleration values 440 and at still other times (e.g., in row 406), the real-time acceleration values 450 are lower than the standard acceleration values 440 of the example. In addition, it can be seen that delta values 460 are sometimes zero (e.g., in row 404), while at other times they are positive or negative values (e.g. in rows 402 and 406, respectively), in the example. This driver therefore exhibited several violations in driving performance (e.g., speeding) according to the sample measurements of velocity and acceleration.

The additional columns 470-490 in FIG. 4 also indicate that the rate of change in the driver's performance is non-zero at some points in time, which may be indicative of erratic changes in speed.

Figure 5:
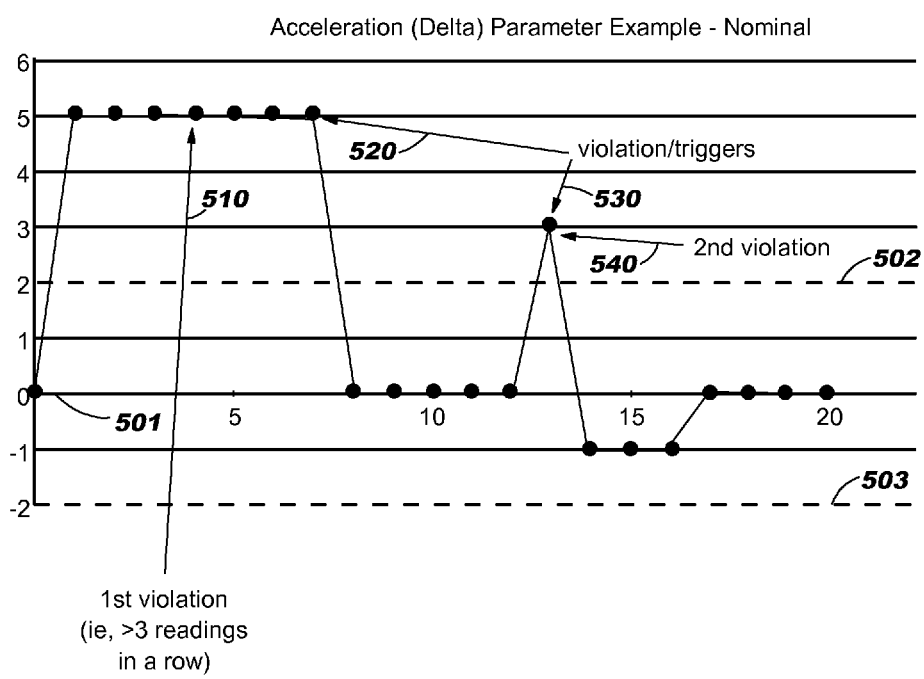
FIG. 5 is a chart illustrating a plotting of sample delta values from FIG. 4.

FIG. 5 is a chart 500 illustrating a plotting of the sample delta values 460 from FIG. 4. The x-axis 501 corresponds to the points in time 410 at which measurements were taken (and has been marked only at 5-second intervals so as not to obstruct other portions of the chart), while the y-axis corresponds to units of the delta values 460. The chart 500 also depicts thresholds 502, 503 corresponding to plus or minus 2 units of deviation from 0, thereby indicating that (for this example) a delta of +1 or −1 is not considered significant on its own. For the sample data, a delta of 5 was computed at time intervals 1 though 7, or in other words, for 6 readings in a row. See column 460 of rows 402-403. See arrow 520, which annotates the chart 500 to note these values. Arrow 530 also annotates chart 500 to note a delta value of +3 (corresponding to row 405). Suppose for purposes of illustration that an operational alert trigger is defined that will be triggered whenever the delta value exceeds the +2 threshold 502 for more than 3 readings in a row. Arrow 510 annotates chart 500 to note when this operational alert will be triggered. Finally, suppose an operational alert trigger is defined for a second violation of the +2 threshold 502 following an earlier violation thereof. Arrow 540 annotates chart 500 to show when this operational alert will be triggered. (Note that arrows 510-540 are added to chart 500 for purposes of discussion herein, and an actual embodiment of the present invention may therefore generate a chart 500 without such arrows.)

As noted earlier, an embodiment of the present invention monitors linearity of the delta between a driver's real-time performance and the corresponding standard. As long as the delta is substantially linear (that is, controlled), no alert is triggered. However, if the delta function becomes non-linear, and is maintained in a non-linear state for a duration which exceeds the parameter's trigger condition, then an alert is preferably triggered. Accordingly, the chart 500 shows that the driver committed two slight violations 510, 540 in a 20-second time period, which averages to a minor violation every 10 seconds. An embodiment of the present invention preferably monitors the running violation rate over time, updating it on some preset schedule—for example, every 30 seconds or perhaps on a varying basis. In the latter case, the updating schedule might be adjustable by the driver, or it might be changed automatically in view of real-time driving performance—such as updating more frequently as speed increases or when the vehicle is in proximity of reduced-speed zone, and so forth.

Figure 6:
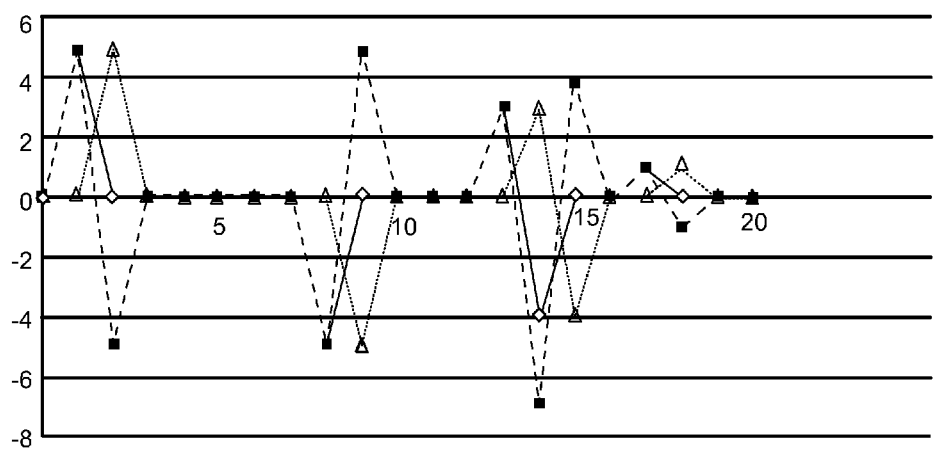
FIG. 6 is a chart illustrating a plotting of the first and second derivative values, as well as delta derivative values, from FIG. 4.

FIG. 6 is a chart 600 illustrating a plotting of the first derivative values 470, the second derivative values 480, and the delta derivative values 490 from FIG. 4. The x-axis again corresponds to the points in time 410 at which measurements were taken (and has been marked only at 5-second intervals so as not to obstruct other portions of the chart), while the y-axis corresponds to units of the delta values 460. A legend 650 is provided by way of distinguishing among the graphed values of the derivatives 470, 480, and 490. These graphed values indicate rates of change, as discussed earlier. By way of example, it can be seen that the first derivative 470 dropped from +5 to 0 from time 1 to time 2, while the second derivative 480 dropped from +5 to −5 in the same time interval.

FIG. 7 is a table 700 presenting sample values for velocity and acceleration, and corresponds to monitored characteristics for a dangerous driving scenario. Values shown in table 700 are computed in an analogous manner to those of table 400 of FIG. 4, and the discussion of how those computations are performed will therefore not be repeated.

The standard values shown in each row of columns 720 and 740 are identical to those of columns 420 and 440, for this example. The real-time velocity values in column 730 now indicate that the driver is frequently changing the velocity of the vehicle, while the real-time acceleration values in column 750 indicate that the driver is frequently accelerating as well as frequently decelerating. Delta column 760 contains no non-zero values after the measurement at time 0, indicating that the driver's performance is not within acceptable bounds. The values in derivative columns 770-790 also indicate erratic changes in the driver's performance.

Figure 8:
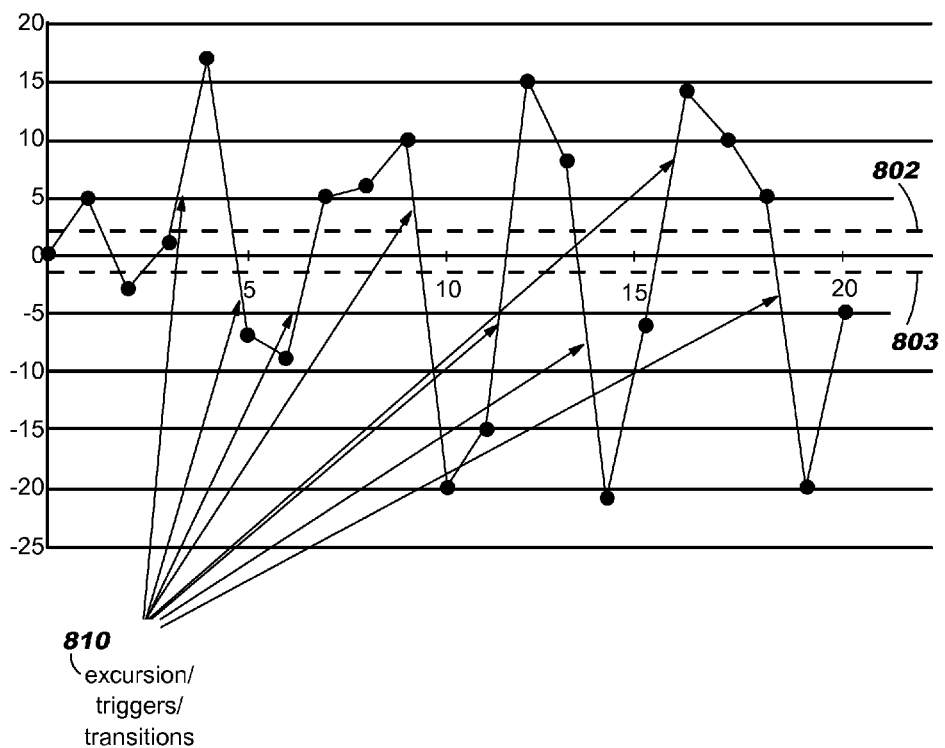
FIG. 8 is a chart illustrating a plotting of sample delta values from FIG. 7.

FIG. 8 is a chart 800 illustrating a plotting of the sample delta values 760 from FIG. 7, and the x-axis and y-axis are as discussed above with reference to chart 500 of FIG. 5. Chart 800 also depicts thresholds 802, 803 corresponding to plus or minus 2 units of deviation from 0, which are analogous to thresholds 502, 503. For the sample data in FIG. 7, the plotting in FIG. 8 indicates that the driver committed many violations in 20 seconds, and most of these violations are relatively significant. The violations include, in this example, the degree to which the thresholds were exceeded and the degree of change from one point in time to another. See generally the arrows at 810, which annotate the chart 800 to note several of these violations.

Figure 9:
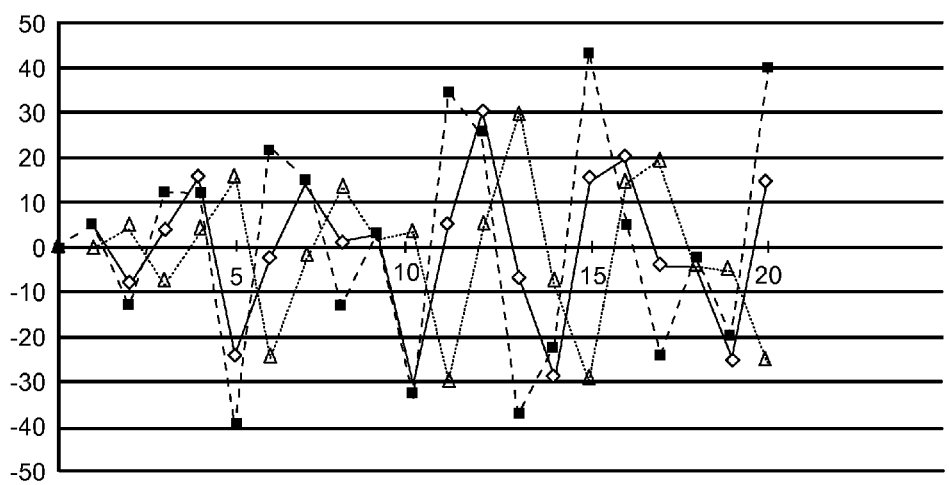
FIG. 9 is a chart illustrating a plotting of the first and second derivative values, as well as delta derivative values, from FIG. 7.

FIG. 9 is a chart 900 illustrating a plotting of the first derivative values 770, the second derivative values 780, and the delta derivative values 790 from FIG. 7. The x-axis, y-axis, and legend 950 are as described above with reference to chart 600 of FIG. 6. By comparison, it can be seen that the plotted values in FIG. 9 depict significantly more variations that those of FIG. 6, indicating that the driver whose performance corresponds to underlying FIG. 4 is performing better than the driver whose performance corresponds to underlying FIG. 7.

While several examples of operational alert triggers have been discussed above, an embodiment of the present invention may be adapted for use with a variety of scenarios. In additional, the operational alert trigger definitions may vary from simple to complex. Rules may be used in the definitions, and may specify one or more actions to be taken when an alert is triggered. When multiple actions are specified, the rules may further indicate whether these actions are to be performed in sequence or in parallel, and/or whether a single one of the actions is to be selected for execution. Illustrative (and non-limiting) examples include:

ignore the first occurrence of a particular alert, but continue monitoring, and take action if a second occurrence is detected within some number of seconds (where the particular number of seconds may be configurable in some embodiments, or may be predefined in others);

alert the driver with a soft cautionary note;

alert the driver with a hard alert, coupled with causing the vehicle's engine to misfire or the transmission to gradually slip, followed by gradually bringing the vehicle to a halt or otherwise placing the vehicle in an emergency-type mode (for example, when a driver exhibits characteristics such as those represented in FIG. 7);

alert local law enforcement; and alert nearby drivers with an RF warning signal, which could trigger a light or audible signal in the vehicles of the nearby drivers.

In a scenario where an alert is sent to nearby drivers, a particular distance may be defined as to which vehicles are considered "nearby". For example, an alert might be sent to all vehicles within 100 feet, or perhaps within 200 yards. This distance may be preset within the alert definition, or it may be configurable. The alert may be sent by broadcast, such that it will be received by any vehicle within range for receiving the broadcast. Or, the alert may be sent to a targeted address (e.g., an address that corresponds to a specific nearby vehicle). Techniques for determining which vehicles are nearby, and how to contact those vehicles, are outside the scope of the present invention.

Figure 10:
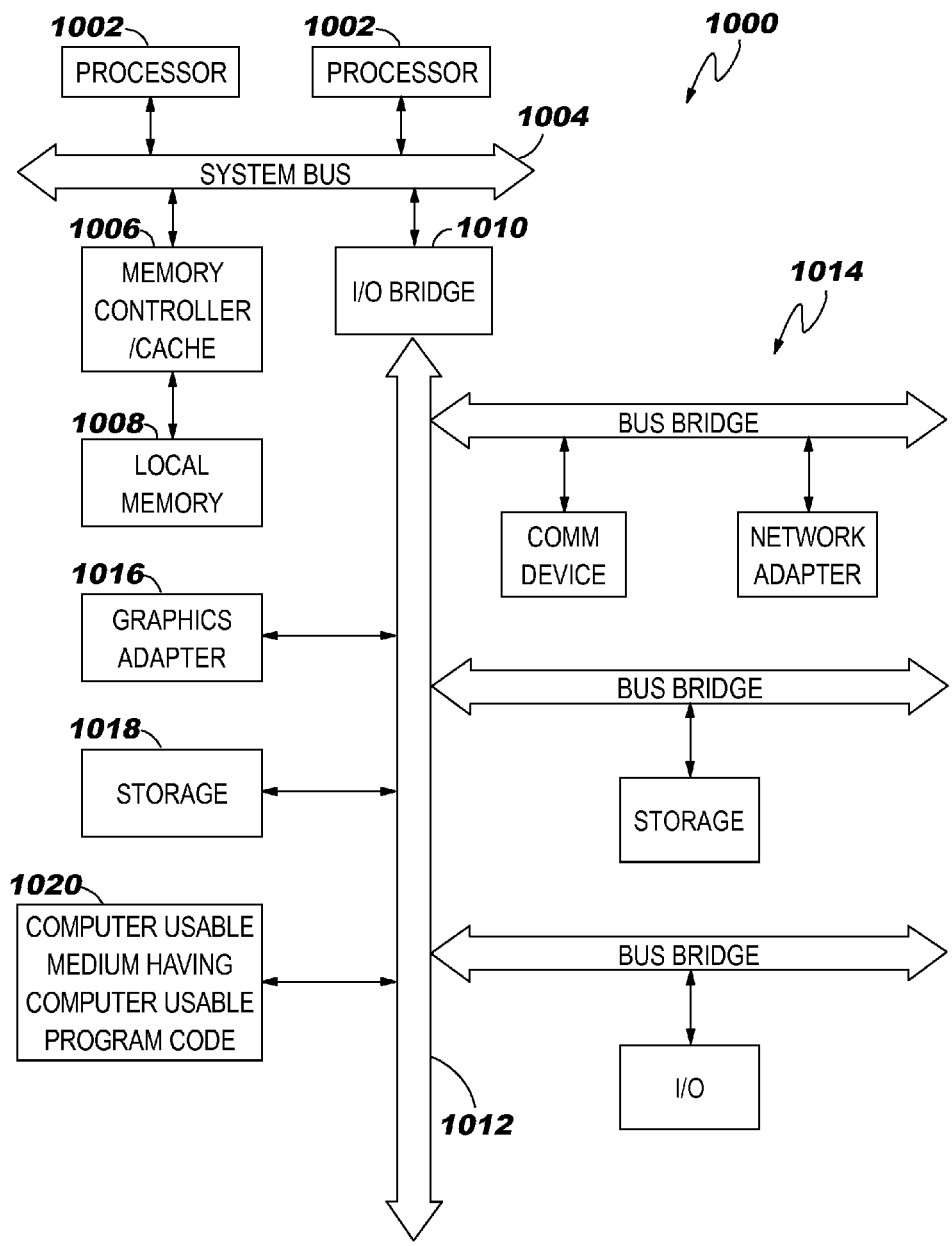
FIG. 10 depicts a data processing system suitable for storing and/or executing program code.

Referring now to FIG. 10, a block diagram of a data processing system is depicted in accordance with the present invention. Data processing system 1000 may comprise a symmetric multiprocessor ("SMP") system or other configuration including a plurality of processors 1002 connected to system bus 1004. Alternatively, a single processor 1002 may be employed. Also connected to system bus 1004 is memory controller/cache 1006, which provides an interface to local memory 1008. An I/O bridge 1010 is connected to the system bus 1004 and provides an interface to an I/O bus 1012. The I/O bus may be utilized to support one or more buses 1014 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1016, storage 1018, and a computer usable storage medium 1020 having computer usable program code embodied thereon. The computer usable program code may be executed to execute any aspect of the present invention, as have been described herein.

The data processing system depicted in FIG. 10 may be, for example, an IBM System P® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 11:
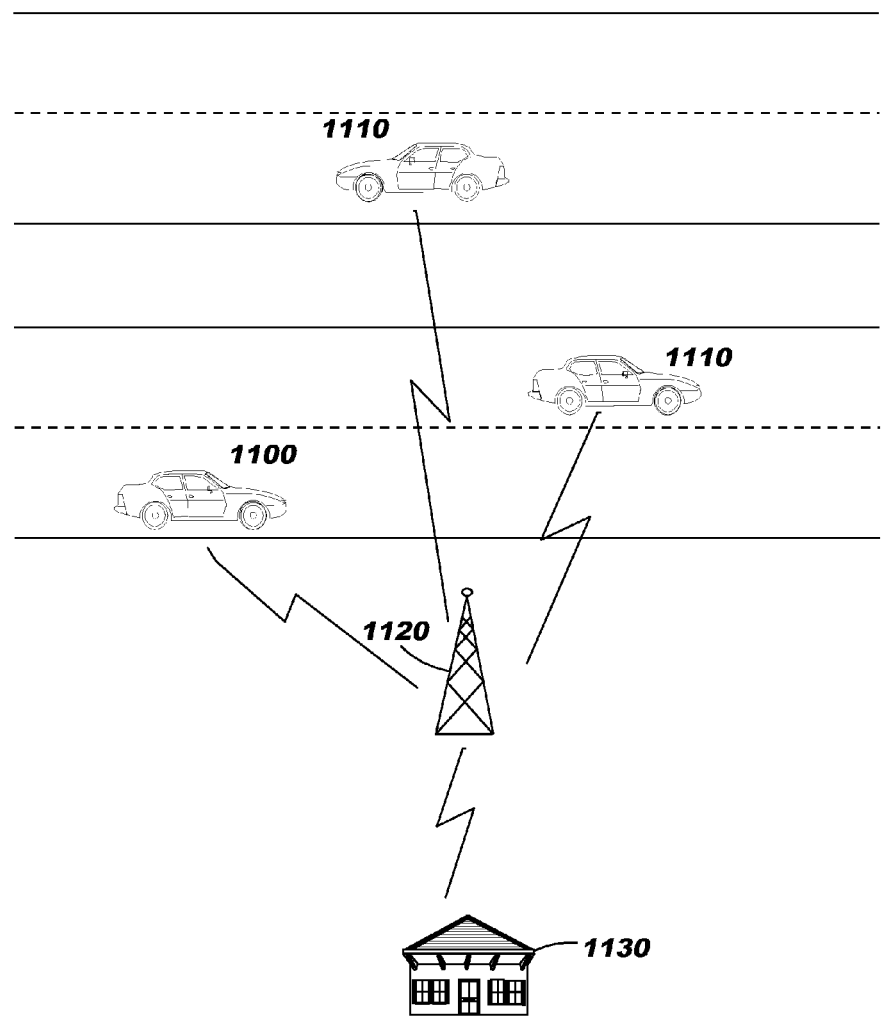
FIG. 11 depicts vehicles communicating through wireless technology, which is representative of a networking environment in which one or more embodiments of the present invention may be used.

FIG. 11 depicts vehicles communicating through wireless technology, which is representative of a networking environment in which one or more embodiments of the present invention may be used. As shown therein, a monitored vehicle 1100 is in wireless network communications with a transmission tower 1120. Nearby vehicles are depicted at 1110, and are shown as also communicating through this transmission tower 1120. (As will be obvious, it is not strictly necessary that all vehicles which receive alerts according to the present invention communicate through a single transmission tower.) A facility 1130 is also depicted in FIG. 11, which may be a law enforcement facility (as discussed above), and is shown as also communicating through transmission tower 1120. Techniques for wireless communication and the types of computing devices which support such communication are well known in the art, and details thereof are not deemed necessary to an understanding of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method for real-time vehicle driver performance monitoring, comprising:
    operating a plurality of sensors in a vehicle, each generating a real-time data stream corresponding to operation of the vehicle by a driver thereof;
    processing, by a computing device, the generated data stream from each of the plurality of sensors to determine whether the operation of the vehicle triggers any of a plurality of predetermined operational alert triggers, wherein:
        at least one of the predetermined operational alert triggers corresponds to detecting characteristics of an improper magnitude in data in the data stream generated by one of the sensors, the characteristics of the improper magnitude measuring a magnitude of change represented in the data in the data stream generated by the sensor; and
        at least one of the predetermined operational alert triggers corresponds to detecting characteristics of an improper linearity of a delta in data in the data stream generated by one of the sensors, the characteristics of the improper linearity of the delta measuring a rate of change represented in the data in the data stream generated by the sensor; and
    responsive to any of the plurality of predetermined operational alert triggers being triggered, performing:
        generating a corresponding alert message for the triggered operational alert;
        determining at least one recipient corresponding to the generated alert message; and
        sending the generated alert message to the determined at least one recipient.

2. The method according to claim 1, wherein the sending uses radio frequency broadcast transmission from a radio frequency transmitting device in the vehicle.

3. The method according to claim 1, wherein the determining comprises determining that the alert message is to be sent by radio frequency transmission to a radio frequency receiving device in any nearby vehicles.

4. The method according to claim 1, wherein the determining comprises determining that the alert message is to be sent to the vehicle for causing a corresponding warning to be provided to the driver.

5. The method according to claim 1, wherein the determining comprises determining that the alert message is to be sent by radio frequency transmission to a radio frequency receiving device in a driver performance monitoring agency.

6. The method according to claim 1, wherein the magnitude of change, for a particular one of the sensors, comprises one of:
    a count of a number of times the driver alters a direction of steering the vehicle within a first fixed interval of time;
    a count of a number of times the driver accelerates the vehicle within a second fixed interval of time;
    a count of a number of times the driver applies a braking mechanism of the vehicle within a third fixed interval of time; and
    a count of a number of times the driver alters the direction of steering the vehicle without using a turn signal indicator mechanism of the vehicle within a fourth fixed interval of time; and
    wherein any of the first, second, third, and fourth fixed interval of time may be identical.

7. The method according to claim 1, wherein the rate of change, for a particular one of the sensors, comprises one of:
    a first derivative of a speed of the vehicle within a first fixed interval of time;
    a second derivative of the speed of the vehicle within the first fixed interval of time;
    a first derivative of a displacement in time of the vehicle within the first fixed interval of time;
    a second derivative of the displacement in time of the vehicle within the first fixed interval of time;
    a first derivative of an acceleration of the vehicle within a second fixed interval of time;
    a second derivative of the acceleration of the vehicle within the second fixed interval of time;
    a first derivative of a braking of the vehicle within a third fixed interval of time;
    a second derivative of the braking of the vehicle within the third fixed interval of time;
    a first derivative of a use of turn signal indicators of the vehicle within a fourth fixed interval of time; and a second derivative of the use of turn signal indicators of the vehicle within the fourth fixed interval of time; and wherein any of the first, second, third, and fourth fixed interval of time may be identical.

8. The method according to claim 1, wherein the characteristics of the improper magnitude measure a number of times a mobile communication device is used within the vehicle within a fixed unit of time, according to the data in the data stream generated by a particular one of the sensors.

9. The method according to claim 8, wherein the use of the mobile communication device comprises at least one of voice usage and text communication usage.

10. The method according to claim 1, wherein at least one of the predetermined operational alert triggers is configured to be specific to at least one of: (i) a make of the vehicle and (ii) a model of the vehicle.

11. The method according to claim 1, wherein at least one of the predetermined operational alert triggers is configured to be specific to an age of the driver.

12. The method according to claim 1, wherein at least one of the predetermined operational alert triggers is configured to be specific to a past driving record of the driver.

13. The method according to claim 1, wherein at least one of the predetermined operational alert triggers is configured to dynamically vary with real-time weather conditions.

14. The method according to claim 1, wherein at least one of the predetermined operational alert triggers is configured to dynamically vary with real-time road terrain conditions.

15. The method according to claim 1, wherein the characteristics detected by at least one of the predetermined operational alert triggers are configurable by the driver.

16. The method according to claim 1, wherein the performing further comprises, for at least one of the plurality of predetermined operational alert triggers, causing the vehicle to enter a mode in which the vehicle ceases to operate.

17. The method according to claim 1, wherein the linearity of the delta represents a measure of stability in the data in the data stream generated by the sensor.

18. The method according to claim 1, wherein the processing comprises:
computing a first derivative of a parameter represented in the data, the first derivative corresponding to a change in the parameter over a unit of time;
computing a second derivative of the parameter represented in the data, the second derivative corresponding to a change in the first derivative of the parameter over the unit of time;
computing a delta derivative of the parameter represented in the data, the delta derivative corresponding to a difference between the second derivative of the parameter and the first derivative of the parameter over the unit of time;
comparing the computed first derivative, the computed second derivative, and the computed delta derivative to corresponding standard values; and
concluding that at least one of the plurality of predetermined operational alert triggers is triggered based on results of the comparing.

19. A computer-implemented system for real-time vehicle driver performance monitoring, comprising:
a computer comprising a processor; and
instructions which are executable, using the processor, to implement functions comprising:
receiving a data stream from each of a plurality of sensors in a vehicle, each data stream generated in real-time and corresponding to operation of the vehicle by a driver thereof;
processing, by a computing device, the generated data stream received from each of the plurality of sensors to determine whether the operation of the vehicle triggers any of a plurality of predetermined operational alert triggers, wherein:
at least one of the predetermined operational alert triggers corresponds to detecting characteristics of an improper magnitude in data in the data stream generated by one of the sensors, the characteristics of the improper magnitude measuring a magnitude of change represented in the data in the data stream generated by the sensor; and
at least one of the predetermined operational alert triggers corresponds to detecting characteristics of an improper linearity of a delta in data in the data stream generated by one of the sensors, the characteristics of the improper linearity of the delta measuring a rate of change represented in the data in the data stream generated by the sensor; and
responsive to any of the plurality of predetermined operational alert triggers being triggered, performing:
generating a corresponding alert message for the triggered operational alert;
determining at least one recipient corresponding to the generated alert message; and
sending the generated alert message to the determined at least one recipient.

20. A computer program product for real-time vehicle driver performance monitoring, the computer program product comprising:
a non-transitory computer-readable storage medium having computer readable program code embodied therein, the computer-readable program code configured for:
receiving a data stream from each of a plurality of sensors in a vehicle, each data stream generated in real-time and corresponding to operation of the vehicle by a driver thereof;
processing, by a computing device, the generated data stream received from each of the plurality of sensors to determine whether the operation of the vehicle triggers any of a plurality of predetermined operational alert triggers, wherein:
at least one of the predetermined operational alert triggers corresponds to detecting characteristics of an improper magnitude in data in the data stream generated by one of the sensors, the characteristics of the improper magnitude measuring a magnitude of change represented in the data in the data stream generated by the sensor; and
at least one of the predetermined operational alert triggers corresponds to detecting characteristics of an improper linearity of a delta in data in the data stream generated by one of the sensors, the characteristics of the improper linearity of the delta measuring a rate of change represented in the data in the data stream generated by the sensor; and
responsive to any of the plurality of predetermined operational alert triggers being triggered, performing:
generating a corresponding alert message for the triggered operational alert;
determining at least one recipient corresponding to the generated alert message; and
sending the generated alert message to the determined at least one recipient.

* * * * *